(12) United States Patent
Ren et al.

(10) Patent No.: US 10,901,693 B2
(45) Date of Patent: Jan. 26, 2021

(54) COST-AWARE SECURE OUTSOURCING

(71) Applicant: Board of Trustees of Michigan State University, East Lansing, MI (US)

(72) Inventors: Jian Ren, Okemos, MI (US); Kai Zhou, Lansing, MI (US)

(73) Assignee: BOARD OF TRUSTEES OF MICHIGAN STATE UNIVERSITY, East Lansing, MI (US)

(*) Notice: Subject to any disclaimer, the term of this patent is extended or adjusted under 35 U.S.C. 154(b) by 0 days.

(21) Appl. No.: 15/624,408

(22) Filed: Jun. 15, 2017

(65) Prior Publication Data

US 2017/0364327 A1 Dec. 21, 2017

Related U.S. Application Data

(60) Provisional application No. 62/350,651, filed on Jun. 15, 2016.

(51) Int. Cl.
| | |
|---|---|
| *G06F 7/48* | (2006.01) |
| *G06F 7/78* | (2006.01) |
| *G06F 9/50* | (2006.01) |
| *G06F 9/48* | (2006.01) |
| *G06F 21/00* | (2013.01) |

(52) U.S. Cl.
CPC .............. *G06F 7/48* (2013.01); *G06F 7/78* (2013.01); *G06F 9/4843* (2013.01); *G06F 9/50* (2013.01); *G06F 21/00* (2013.01)

(58) Field of Classification Search
CPC ............. G06F 7/48; G06F 7/78; G06F 9/4843
See application file for complete search history.

(56) References Cited

U.S. PATENT DOCUMENTS

2003/0018608 A1* 1/2003 Rice ..................... G06F 21/14
2012/0002811 A1* 1/2012 Smart .................. H04L 9/085
380/255

OTHER PUBLICATIONS

Wang et al., "Secure and Practical Outsourcing of Linear Programming in Cloud Computing", pp. 820-828 (Year: 2011).*
Salinas et al. ("A Tutorial on Secure Outsourcing of Large-scale Computations for Big Data", pp. 1406-1416 (Year: 2016).*
Gennaro et al., "Non-Interactive Verifiable Computing: Outsourcing Computation to Untrusted Workers", pp. 1-19 (Year: 2010).*

(Continued)

*Primary Examiner* — Chuong D Ngo
(74) *Attorney, Agent, or Firm* — Quarles & Brady LLP

(57) ABSTRACT

Systems and methods of the present invention provide for one or more server computers communicatively coupled to a network and configured to: receive a request to execute a computational task, including a transformed input used to execute a computational task. A client computer transforms the original input into the transformed input, using an affine mapping where the transformed input is a one-to-one equivalent to the original input (but which can't be inferred by the server computer), and according to a user selection limiting the computational complexity of the mapping according to resource constraints on the client. The server may then execute the computational task and transmit a result to the client to apply an inverse affine mapping, and receive a response which verifies that the computational task result is complete and valid.

14 Claims, 5 Drawing Sheets

(56) References Cited

OTHER PUBLICATIONS

Atallah, et al., "Secure outsourcing of sequence comparisons," International Journal of Information Security, vol. 4, No. 4, pp. 277-287, 2005.
Atallah, et al., "Securely outsourcing linear algebra computations," in Proceedings of the 5th ACM Symposium on Information, Computer and Communications Security, pp. 48-59, ACM, 2010.
Atallah et al., "Secure outsourcing of scientific computations," Advances in Computers, vol. 54, pp. 215-272, 2002.
Benjamin, et al., "Private and cheating-free outsourcing of algebraic computations," in Privacy, Security and Trust, 2008. PST'08. Sixth Annual Conference on, pp. 240-245, IEEE, 2008.
Blanton, et al., "Secure outsourcing of dna searching via finite automata," in Data and Applications Security and Privacy XXIV, pp. 49-64, Springer, 2010.
Blanton, et al., "Secure and efficient outsourcing of sequence comparisons," in Computer Security—ESORICS 2012, pp. 505-522, Springer, 2012.
Zhou, et al., CASO: Cost-aware secure outsourcing general computational problems, IEEE Transactions on Services Computing, 2015, IEEE, United States, pp. 1-14.
Chen,, et al., "New algorithms for secure outsourcing of modular exponentiations," in Computer Security—ESORICS 2012, pp. 541-556, Springer, 2012.
Chen,, et al., "New algorithms for secure outsourcing of large-scale systems of linear equations," Information Forensics and Security, IEEE Transactions on, vol. 10, No. 1, pp. 69-78, 2015.
Gennaro, et al., "Non-interactive verifiable computing: Outsourcing computation to untrusted workers," in Advances in Cryptology—CRYPTO 2010, pp. 465-482, Springer, 2010.
Gentry, "Fully homomorphic encryption using ideal lattices," in STOC, vol. 9, pp. 169-178, 2009.
Hohenberger, et al., "How to securely outsource cryptographic computations," in Theory of Cryptography, pp. 264-282, Springer, 2005.
Nie, et al., "Efficient and verifiable algorithm for secure outsourcing of large-scale linear programming," in Advanced Information Networking and Applications (AINA), 2014 IEEE 28th International Conference on, pp. 591-596, IEEE, 2014.
Paillier, "Public-key cryptosystems based on composite degree residuosity classes," in Advances in cryptology-EUROCRYPT, pp. 223-238, Springer, 1999.
Yao, "Protocols for secure computations," in 2013 IEEE 54th Annual Symposium on Foundations of Computer Science, pp. 160-164, IEEE, 1982.
Salinas, A tutorial on secure outsourcing of large-scale computations for big data, IEEE Translations, Apr. 4, 2016, vol. 4, IEEE, United States.
Seitkulov, "New methods of secure outsourcing of scientific computations," The Journal of Supercomputing, vol. 65, No. 1, pp. 469-482, 2013.
Wang, et al., "Secure and practical outsourcing of linear programming in cloud computing," in INFOCOM, 2011 Proceedings IEEE, pp. 820-828, IEEE, 2011.
Wang, et al., "Harnessing the cloud for securely solving large-scale systems of linear equations," in Distributed Computing Systems (ICDCS), 2011 31st International Conference on, pp. 549-558, IEEE, 2011.
Xu, et al., "Proof-carrying cloud computation: The case of convex optimization," in INFOCOM, 2013 Proceedings IEEE, pp. 610-614, IEEE, 2013.

* cited by examiner

Computational Task Outsourcing Control Panel

Enter your computational task, software calculation or problem below:

F(x), where x = (x₁, x₂, ..., xₙ)

| Diagonal matrix ▽ |
| Permutation matrix |
| Band matrix |
| Sparse matrix |

Submit

Result(s):

Proof:

Select TRUE to verify that the Results and Proof are complete and valid, otherwise select FALSE:

True ▽

FIG. 4

COST-AWARE SECURE OUTSOURCING

CROSS REFERENCE TO RELATED PATENT APPLICATIONS

This patent application claims priority to provisional application No. 62/350,651 titled "COST-AWARE SECURE OUTSOURCING" filed Jun. 15, 2016, which is incorporated by reference herein in its entirety.

FIELD

The present invention generally relates to the field of cloud outsourcing and specifically to the field of outsourcing computational tasks or problems to cloud servers for a valid and complete result without exposing the details of the computational tasks or problems to the cloud servers.

BACKGROUND

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the web sites and their corresponding web pages on the Internet is generally known as the World Wide Web (WWW) or simply the Web.

The Internet provides means for users to take advantage of cloud computing. A cloud computing paradigm provides end-users an on-demand access to a shared pool of computing resources, such as computational power and storage. It enables the end-users to utilize those resources in a pay-per-use manner instead of purchasing expensive equipment upfront. Computation outsourcing is one task that can be performed using cloud computing. It enables the resource-constrained end-users to outsource their computational tasks to the cloud via cloud servers and utilize the shared cloud resources in a pay-per-use manner. Then, the tasks may be processed in the cloud servers and solutions may be returned to the end-users. The technical and economic advantages make computation outsourcing a promising application for cloud computing.

Unfortunately, security has become one of the major concerns that prevents computation outsourcing using the cloud from being widely adopted. There are several reasons that the cloud cannot be fully trusted. Among them, administrators of the cloud may be honest but curious, or may not take an appropriate degree of caution and monitoring to identify and prevent security vulnerabilities and hacking. An end-user of a cloud service often has little or no insight into, or control over, the amount of protection a cloud server has to prevent security threats.

Additionally, cloud servers may collect for a variety of reasons any information that could be revealed by any task or problem outsourced to the cloud. Once tasks and/or problems are outsourced to the cloud, the end-users may lose all control of their own data, which may result in severe security issues especially when the data is sensitive. The cloud servers may gain full access to not only the problem itself but also the input, the intermediate computational results and the output of the problem, which may contain sensitive end-user data, such as financial statistics or health records. As a result, the end-users' privacy, specifically the private data and computational results, maybe totally exposed to the cloud. As a result, effective mechanisms must be developed to protect this private interim and end-user information.

Administrators of the cloud are also profit-motivated, and may therefore be tempted to cheat the amount of resources required to comprehensively address the tasks and/or problems outsourced to their cloud servers. This is because the computing resources are regarded as a kind of commodity and the cloud may try to reduce the cost by simply not investing enough computing resources as it had claimed. For example, the cloud may just return a trivial result for an outsourced task thus saving a lot of resources. That is, as the end-users pay for the resources during the computation process, the cloud servers may be configured to reduce the cost by utilizing less resources and simply returning a trivial, less comprehensive result to the tasks and/or problems presented, or worse, may receive a result that includes a false solution to the end-users' tasks and/or problems. All these issues call for designs of more secure and privacy-preserving outsourcing mechanisms that can also provide end-users the ability to validate the received results. As a result, a secure outsourcing scheme should not only prevent the private information from being exposed to the cloud but also guarantee that the end-users can receive valid results.

In light of these security and efficiency threat models, the systems and methods disclosed herein improve over existing systems and methods in the following way. First, soundness: Given that the cloud is untrustworthy, the transformation of the problem and the inverse transformation of the returned result effectively guarantees that the recovered solution is correct, as demonstrated by the disclosed invention. Second, security: When the problem is outsourced to the cloud, it is to be computationally infeasible for the cloud server to infer the coefficient matrix, the input and output of the original outsourced problem. Third, verifiability: In case the cloud cannot be fully trusted, the end user has the ability to verify the validity of the solution returned by the cloud. Fourth, efficiency: The outsourcing scheme disclosed herein is efficient in computation and communication. For computation, the overhead caused by the problem transformation, the inverse transformation and the result verification should be limited to $O(n^2)$. For communication, the overhead caused by the outsourcing process is in the same level as that of outsourcing the original problem. Fifth and finally, cost-awareness: The end-users are able to select different outsourcing strategies according to their own computational constraints and security demands in a cost-aware manner.

SUMMARY

The present invention provides systems and methods comprising one or more server computers communicatively coupled to a network and including instructions, that when executed by a processor running on the one or more server computers, cause the one or more server computers to:

receive a request to execute a computational task, including a transformed input used to execute a computational task. A client computer transforms the original input into the transformed input, using an affine mapping where the transformed input is a one-to-one equivalent to the original input (but which can't be inferred by the server computer), and according to a user selection limiting the computational complexity of the mapping according to resource constraints on the client. The server may then execute the computational task and transmit a result to the client to apply an inverse affine mapping, and receive a response which verifies that the computational task result is complete and valid.

For example, one aspect of the invention may be a system comprising at least one processor of a network of server computers and at least one at least one memory of the network of server computers that is coupled to the at least one processor and stores a set of instructions which, when executed, cause the network of server computers to: receive, from a user interface on a client computer coupled to the network, a request to execute a computational task and at least one transformed input to be utilized by the network to execute the computational task. The transformed input had been transformed by the client computer by transforming at least one original input into the at least one transformed input using an affine mapping based scheme according to a coefficient matrix in which the transformed input is a one-to-one equivalent to the at least one original input, but cannot be inferred by the network; and according to a selection from the user interface, limiting the computational complexity of the affine mapping scheme according to at least one resource constraint of the client computer. The instructions on the memory further cause the network to execute the computational task, transmit, to the client computer a result of the computational task, and receive, from the user interface, responsive to the client computer applying an inverse affine mapping scheme to the result, a verification that the result of the computational task comprises a complete and valid result.

In another example of the invention, a method can be realized for computing complex computational tasks by securely engaging remote resources comprising the steps of: transforming, via at least one processor of a user's client computer, at least one original input into at least one transformed input using an affine mapping based scheme according to a coefficient matrix in which the at least one transformed input is a one-to-one equivalent to the at least one original input, wherein the original input cannot be inferred by a computational resource from the transformed input alone; according to at least one user setting, limiting the computational complexity of the affine mapping scheme according to at least one resource constraint of the user's client computer; transmitting to a remote computer network the at least one transformed input and a request to execute a computational task using the at least one transformed input; receiving from the remote computer network, a result of the computational task; and via a processor of the client computer, applying an inverse affine mapping scheme to the result, to determine whether the result of the computational task comprises a complete and valid result.

The above features and advantages of the present invention will be better understood from the following detailed description taken in conjunction with the accompanying drawings.

BRIEF DESCRIPTION OF THE DRAWINGS

FIG. 4 is an example embodiment including a user interface used in the cost-aware secure outsourcing system

DETAILED DESCRIPTION

Figure 1:
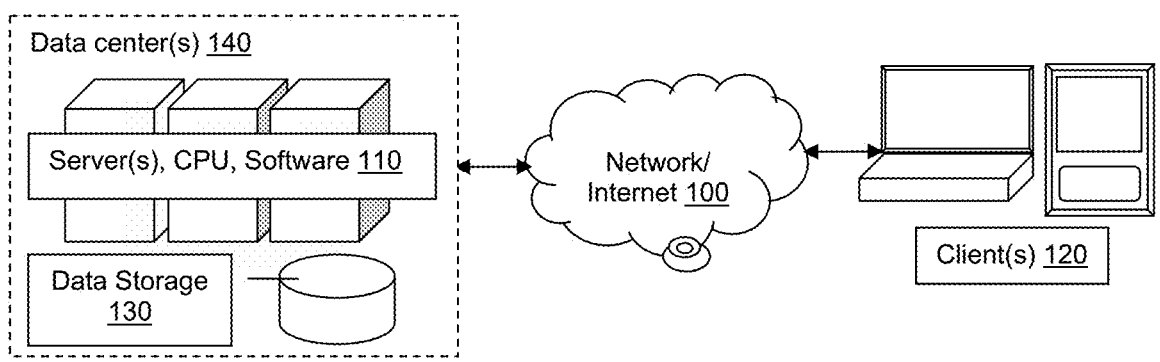
FIG. 1 illustrates a possible cost-aware secure outsourcing system

The present inventions will now be discussed in detail with regard to the attached figures that were briefly described above. In the following description, numerous specific details are set forth illustrating various methods, embodiments, and aspects of the invention. It should be recognized, however, that the present invention may be practiced without many of these specific details, and in other implementations. In other instances, well-known machines, structures, and method steps have not been described in particular detail in order to avoid unnecessarily obscuring the present invention. Unless otherwise indicated, like parts and method steps are referred to with like reference numerals.

The disclosed systems and methods outsource of general computational problems which constitute the mathematical basics for problems emerged from various fields such as engineering and finance. In one embodiment, these systems and methods utilize affine mapping based schemes for the problem transformation and outsourcing so that the cloud is unable to learn any key information from the transformed problem. In some embodiments, the problem and/or solution may be processed prior to being exposed to any unsecured processors, so that if the processors are compromised, from a security point of view, the problems and/or solutions are not vulnerable through the unsecured processors. Meanwhile, the overhead for the transformation is limited to an acceptable level compared to the computational savings introduced by the outsourcing itself. Furthermore, the systems and methods disclosed herein use cost-aware schemes to balance the trade-offs between end users' various security demands and computational overhead, and a verification scheme to ensure that the end-users will always receive a valid solution from the cloud. The disclosed extensive complexity and security analysis of further embodiments demonstrate that the proposed Cost-Aware Secure Outsourcing (CASO) scheme is both practical and effective.

A secure outsourcing scheme is disclosed that is suitable for general computational problems. The challenges come from various aspects. First, the disclosed systems and methods target general computational problems which cover the scope of linear and non-linear problems, such as system of equations (linear or non-linear), linear programming and convex optimization. Due to the different natures of these problems, it is extremely challenging to design an outsourcing scheme suitable for various kinds of computational problems using existing methods, but not nearly so difficult using the systems and methods disclosed herein. Second, in the cloud scenario, end users are resource-constrained which means that the operations can be implemented before and after the outsourcing are quite limited. Third, the end-users vary from handheld mobile devices to desktop workstations in terms of resource constraints and security requirements. Thus, it is not easy to design a scheme that can meet the requirements of various end-users. Generally speaking, as shown herein, a more complex pre-processing of the problem will ensure a more secure outsourcing process. However, it also creates more computational burden on the end-users. Thus, there exists a trade-off between the computational complexity that the end-users can afford and the security they can get in return. All these concerns make it extremely hard to design a secure outsourcing scheme for general computational problems.

To deal with the aforementioned challenges, systems and methods disclosed herein include a secure outsourcing scheme based on affine mappings. In this method, before outsourcing, the independent variables of the computational problem are mapped to a new group of variables through an affine mapping. Correspondingly, the original problem is transformed to a new form that can be securely outsourced to the cloud. Then the cloud can generate valid results from the transformed problem and return the results of the transformed problem back to the end-user. By applying an inverse affine transformation on the results returned from the cloud, the end-user can derive the valid results to the original problem efficiently at the local environment. Thus, the disclosed outsourcing scheme can ensure security of the private information of the original problem.

Thus, the various systems and processes disclosed may include a CASO scheme generally suitable for a wide variety of computational problems, such as system of equations, linear programming and convex optimization. This includes a trade-off between computational complexity and security such that end-users can choose the most suitable outsourcing scheme according to their own resource constraints and security demands. This method also includes a verification process which enables end-users to verify the validity of the results returned from the cloud servers.

Figure 2:
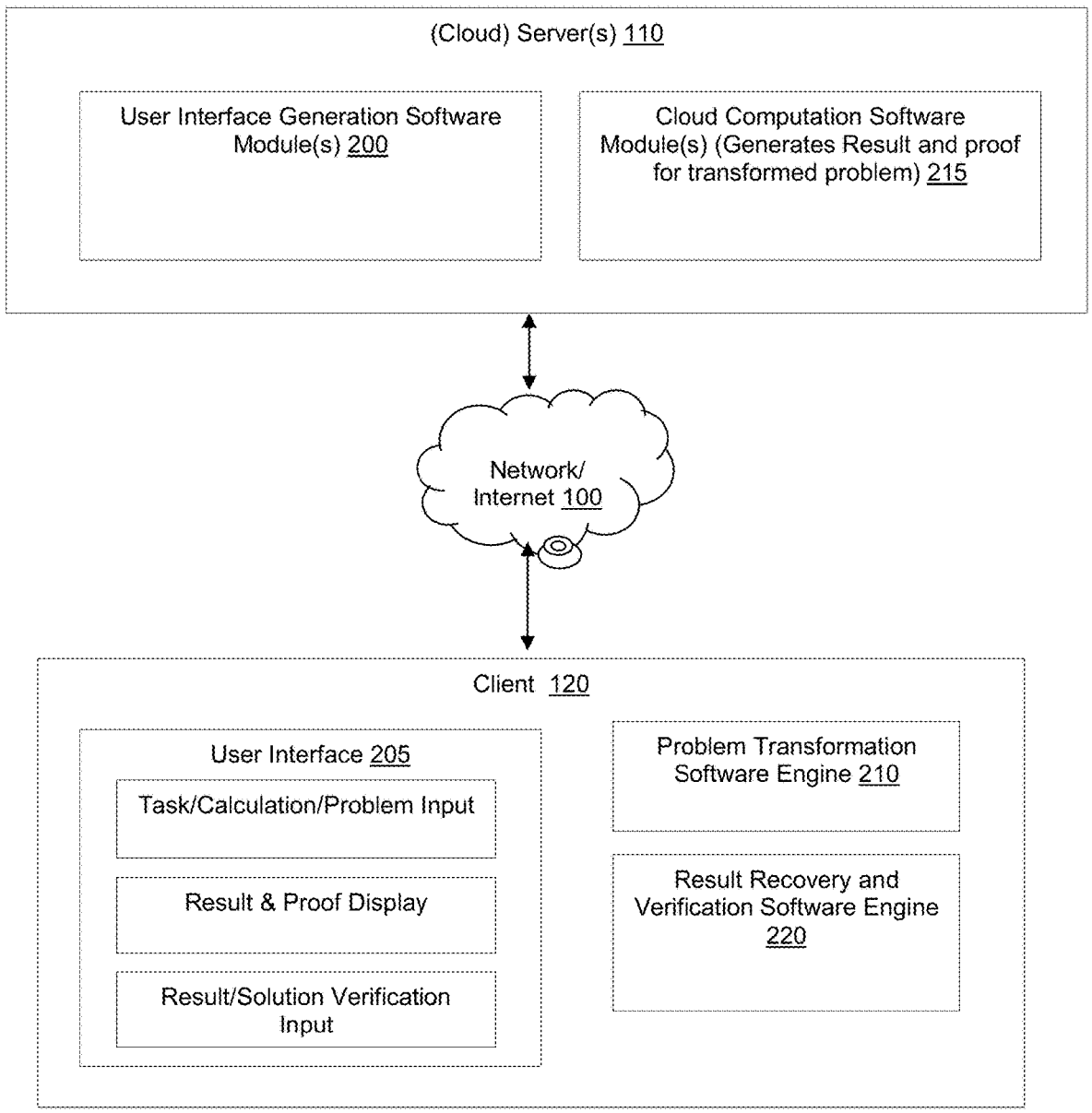
FIG. 2 illustrates a more detailed possible cost-aware secure outsourcing system

FIG. 1, and a more detailed embodiment seen in FIG. 2, illustrate that the embodiments disclosed herein may comprise two entities: one or more client computers 120 operated by one or more end users, and one or more cloud servers 110 and/or one or more cloud data storage and/or cloud databases 130 operating in one or more data centers 140, by one or more cloud service administrators. The data storage 130 may comprise any storage of electronic data for a period of time, and in some embodiments, may be communicatively coupled to the network 100 and/or running on the server(s) 110 or client(s) 120. Each of the clients 120 and/or servers 110 may comprise active and/or static memory for storing one or more software-based instructions. The clients 120 and/or servers 110 may also comprise one or more processors configured to execute the instructions stored within the memory, so that the client(s) 120 and/or server(s) 110 complete the instructions as executed.

For example, as seen in FIG. 2, the instructions may be included within one or more software modules in memory and executed by the processors on the client(s) 120 and/or server(s) 110. These software modules may work together as software engines configured for the client(s) 120 and/or server(s) 110 to complete the method steps described herein in association with the disclosed invention, thereby improving the functionality of the disclosed hardware. For example, as seen in FIG. 2, the processors on server(s) 120 may execute instructions within one or more user interface generation software modules 200 to render and transmit for display on client(s) 120, a user interface 205, such as that seen in FIG. 4.

The user interface 205 may receive, from the end user, the problem, computational task, software calculation, etc. (referred to as "problems" herein) to be outsourced and solved by the cloud server(s) 110. One or more problem transformation software engines 210 may then identify the problem within the original user input and transform the original input, possibly independent variables for the problem, according to the ProbTran phase of the outsourcing process described herein. The client(s) 120, which may use the problem transformation software engine(s) 210, may then transmit the transformed problem to one or more cloud computation software module(s) 215 running on the cloud server(s) 110.

The cloud computation software module(s) 215 may then solve the problem and generate a result and/or solution to the problem according to the CloudCom phase of the outsourcing process described herein. The cloud server(s) 110, may use the cloud computation software module(s) 215, then may transmit the result/solution for the transformed problem, as well as a proof of the result/solution for verification purposes, to the client(s) 120 for display on the user interface 205.

One or more result recovery and verification software modules 220 may apply a secret key that recovers a result/solution to the original problem from the transformed result/solution from the transformed problem, according to the RecVeri phase of the outsourcing process described herein. The recovery and verification software module(s) 220 may transmit the result/solution and/or the proof of the result/solution on the user interface, and the end user may review these and enter a result/solution verification input, possibly in the form of a true or false input, verifying that the result/solution is valid and/or complete. This verification may then be transmitted to the cloud server(s) 110.

Figure 3:
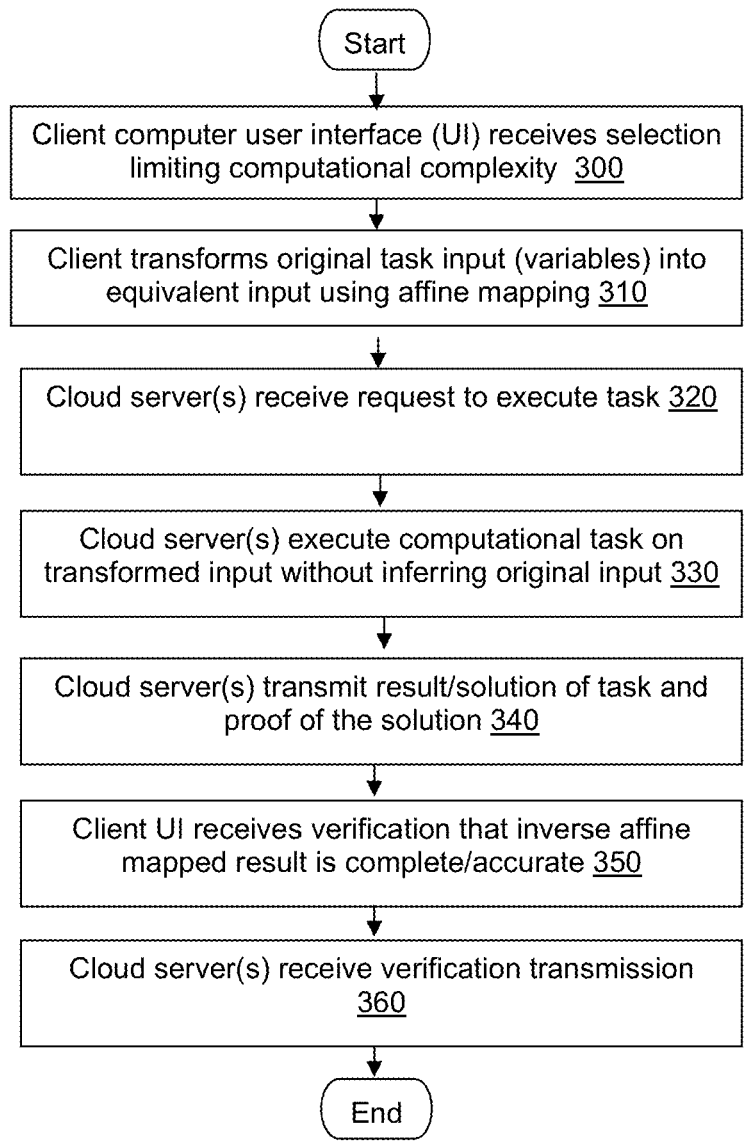
FIG. 3 is a flow diagram illustrating method steps within a possible embodiment of the cost-aware secure outsourcing system

FIG. 3 is a flow diagram demonstrating the method steps performed by the cloud server(s) 110 and/or client(s) 120 in various embodiments disclosed herein. The processors on the client computer(s) 120 execute instructions causing the client(s) 120 to: receive, from an end user using a user interface, a selection limiting the computational complexity of an affine mapping based scheme according to at least one resource constraint of the client computer (Step 300); receive one or more original inputs (e.g., independent problem variables) from the user interface and transform the input into one or more one-to-one equivalent transformed inputs using the selected affine mapping (Step 310), and a request to execute a computational task to generate a result/solution for the transformed problem. The processors on the cloud server(s) 110 execute instructions causing the server(s) 110 to receive the request to execute the computational task (Step 320), execute the computational task on the transformed input without inferring the original input from the transformed input (Step 330), and transmit the transformed result/solution of the computational task to the client(s) 120 along with a proof of the result/solution (Step 340). The client(s) 220 receive the transformed result/solution and proof and apply an inverse affine mapping so that the result/solution to the original problem, as well as the proof, is displayed on user interface on the client(s) 120. The end user, using the user interface, verifies that the result/solution is a complete and valid result, possibly by selecting a user interface control indicating that the verification is true or false.

An example, used throughout this disclosure, may help to demonstrate the mathematical and computational principles described below. In this example, an end-user may be a frequent traveler, who does a great deal of software engineering work (including the example proprietary programming optimization algorithm below) on a laptop computer or mobile device. Because many of the calculations run in relation with this proprietary programming optimization algorithm require more time than that available for battery power for the laptop or mobile device, the end-user may outsource any related problems to the cloud. It should be noted that the example algorithm is non-limiting. Any computational problem capable of being outsourced and solved by the cloud (e.g., a complex chemical or financial problem involving multiple independent variables) may be applied to the disclosed invention.

In this example, suppose that an end-user wants to solve a general computational problem denoted by F(x), where $x=(x_1, x_2, \ldots, x_n)$ is a series of independent variables. Note that F(x) describes a general computational problem not necessarily restricted to a function. For example, it can be a system of equations or an optimization problem.

However, due to lack of resources (e.g., lack of battery life, or poor processor speed, or limited memory), the end-user needs to outsource the problem to the cloud which is considered to have infinite computing resources. Before outsourcing, the end-user will transform the original problem at the local side in order to prevent information leakage. On receiving the transformed problem, the cloud server will carry out the computing process and return the solution to the end-user. Then at the local side, an inverse transformation is carried out on the solution returned from the cloud to recover the solution of the original problem. Based on the transformation and the information returned by the cloud, the end-user is able to verify the validity of the received solution.

Practical applications may demonstrate the utility of the disclosed embodiments. In one example, the user may be a financier working for a venture capital company who has been tasked with solving F(x), which requires the user to invest a certain amount of money, and which requires that intense calculations be performed to work on the data. In this example, and in some embodiments, the user may access an application, or app, on their mobile device, possibly a phone. In some embodiments, the app (possibly integrated with other applications on the client machine) may include a graphical user interface (GUI) receiving user input from the user. In other embodiments, the application and/or submission of the problem may be voice-activated, so that the user may use a vocal command to start the app, and may further submit the problem through voice recognition, possibly in response to vocal and/or audio prompts from the app, secure the information needed to submit to the cloud, and submit the problem to the cloud. The cloud may then calculate the solution to the financial problem, and return the results to the client app for display (or vocal response), as disclosed herein.

Other examples may include the use of the disclosed embodiment in an academic or laboratory environment, where a user submits the problem using a mobile device and outsources the solution to the problem to a computing device local to the laboratory. As noted above, the disclosed embodiments are also useful in resource conservation. For example, if a user needed to convert data within a video file, which would require significant processing and battery resources, the user could outsource the data conversion project to a cloud or other outsourced server, thereby conserving processing and battery resources.

As further noted above, the disclosed embodiments also provide an additional layer of security. As a non-limiting example, users may be concerned about non-secured processors (e.g., a shared processor) within the disclosed system. In these instances, security would be enhanced, in that the non-secured servers would be incapable of creating a security breach. That is, because the algorithms disclosed herein could be applied to the data before reaching the processor, thereby masking or disguising the data, it would be impossible for a security breach within the processor itself to expose the problem or solution data, and would therefore be impossible for a potential hacker to access the data for either the problem or the solution to the problem.

The idea and framework of CASO based on affine mappings is presented in the following section. A system of linear equations may be used as a case study to illustrate the cost-aware design philosophies presented in subsequent sections. In this section, the basic framework of the proposed CASO is presented. In subsequent sections, the equivalence concept of two general computational problems is introduced. Under the provided definition, the process of problem transformation is explained in detail.

As mentioned previously, the example end-user has a general computational problem F(x) to be solved. Due to the lack of resources, the end user needs to outsource F(x) to the cloud. The outsourcing process may be formally divided into the following phases: 1) Problem Transformation: ProbTran $\{S, F(x)\} \rightarrow \{G(y)\}$. In this phase, the end user first generates a secret key S at the local side during the whole process. Based on this secret key, the end-user transforms F(x) to a new form G(y), where y is the new input. 2) Cloud Computation: CloudCom $\{G(y)\} \rightarrow \{y^*, \Phi\}$. On receiving the transformed problem G(y), the cloud carries out the necessary computation and gives the solution y* as well as a proof $\Phi$ of the validity of the returned solution. 3) Result Recovery and Verification: RecVeri $\{y^*, S, \Phi\} \rightarrow \{x^*, \Lambda\}$. By utilizing the secret key S, the end-user recovers solution x* to the original problem from y*. Based on the proof $\Phi$, the end-user gives the decision $\Lambda=\{$True, False$\}$, indicating the validity of x*.

The basic idea of problem transformation is to map the independent variables of the problem to a new group of variables such that the original problem is transformed to a new form. To be specific, suppose the original problem is F(x). We assume that $\psi: \mathbb{R}^n \rightarrow \mathbb{R}^n$ is a general one-to-one mapping function. Let $x=\psi(y)$, then $F(x)=F(\psi(y))=(F \cdot \psi)(y)=G(y)$. In this way, the original input x can be transformed to input y with the relationship determined by the function $\psi$. Below, the equivalence definition of two computational problems is described.

A set of computational problems may be defined as $\Omega=\{\Gamma|\Gamma: \mathbb{R}^n \rightarrow \mathbb{R}^n\}$. For any $F \in \Omega$, if there exists a one-to-one mapping $\psi: \mathbb{R}^n \rightarrow \mathbb{R}^n$ such that $F(x)=F(\psi(y))=(F \cdot \psi)\theta(y)=G(y)$, then F is said to be equivalent to G. We denote it as F~G. The equivalent class of F is denoted as $[F]=\{\Gamma \in \Omega | \Gamma \sim F\}$.

The following theorem (Theorem 2) further applies to the various disclosed embodiments. First, for every $F \in \Omega$, if we select the one-to-one mapping $\psi$ to be the identity mapping, then we have $F(x)=F(\psi(y))=F(y)$. Thus, for every $F \in \Omega$, we have F~F which demonstrates the property of reflexivity. Second, for F, $G \in \Omega$, if F~G, then there exists a one-to-one mapping $\psi$ such that $F(x)=F(\psi(y))=(F \cdot \psi)(y)=G(y)$, which indicates the existence of an inverse mapping $\psi^{-1}$ such that $G(y)=(F \cdot \psi)(\psi^{-1}(x))=F(x)$. Thus, we have G~F and the property of symmetry holds. To prove the property of transitivity, assume that F, G, $H \in \Omega$ such that F~G and G~H. This means that there are two one-to-one mappings $\psi$ and $\varphi$ such that $x=\psi(y)$, $F(x)=F(\psi(y))=G(y)$ and $y=\varphi(z)$, $G(y)=G(\varphi(z))=H(z)$. Therefore, we have $F(x)=F(\psi(y))=F((\psi \cdot \varphi)(z))=H(z)$. Since $\psi$ and $\varphi$ are both one-to-one mappings, the mapping $\psi \cdot \varphi$ is also one-to-one. Thus, from the definition we have F~H and the equivalence relation is transitive.

The following example (Example 3) illustrates the basic idea of problem transformation. Suppose F(x) represents a system of linear equations with two independent variables:

$$F(x) := \begin{cases} x_1 + 2x_2 = 6 \\ 3x_1 + x_2 = 3 \end{cases}.$$

If we take the mapping function as $x=(x_1,x_2)=\psi(y)=(2y_2+1, 3y_1+2)$, the original problem is transformed to $$G(y) = F(\psi(y)) = \begin{cases} 6y_1 + 2y_2 = 1 \\ 3y_1 + 6y_2 = -2 \end{cases}.$$

Since the above mapping is one-to-one, we have F~G according to Definition 1. In fact, the solutions to the two systems also satisfy the same mapping function. It is easy to obtain the solutions as $y^*=(\frac{1}{3},-\frac{1}{2})$ and $x^*=(0, 3)$, which satisfy $x^*=\psi(y^*)$.

The above example gives an insight of CASO. Based on a one-to-one mapping $\psi$, the end-user first transforms the original problem F(x) to an equivalent form G(y) that can be securely outsourced to the cloud. Since the solutions to the two problem satisfy $x^*=\psi(y^*)$, the end-user can always recover $x^*$ from $y^*$ returned by the cloud. Thus, the one aspect of the disclosed transformation scheme lies in finding a proper one-to-one mapping that satisfies the various design goals.

The following definition (Definition 4) may also be used for embodiments disclosed herein, to further describe the problem transformation. An affine mapping $\psi:\mathbb{R}^n \to \mathbb{R}^n$ is defined as a mapping from $x \in \mathbb{R}^n$ to $y \in \mathbb{R}^n$ satisfying $x=Ky+r$, where $K \in \mathbb{R}^{n \times n}$ is nonsingular and $r \in \mathbb{R}^n$.

It is clear that as long as K is nonsingular, the affine mapping defined above is a one-to-one mapping. The soundness of the embodiments disclosed herein based on affine mapping is guaranteed by the following theorem.

The following theorem (Theorem 5—Soundness) applies to the disclosed invention. Under the affine mapping, the transformed problem is equivalent to the original problem. That is the end-user is guaranteed to be able to recover the valid solution of the original problem from the solution returned by the cloud.

Proof:

The proof of soundness follows the definition of equivalence. The affine mapping x=Ky+r is one-to-one as long as K is non-singular. Thus, by definition, F~G under this affine mapping. Since the solutions to the two problems satisfy $x^*=Ky^*+r$, given $y^*$ returned by the cloud, the end-user is able to recover $x^*$ at the local side.

In the rest of this disclosure, it will be shown that the proposed affine mapping based CASO will not only meet the end-user's resource constraints but also conceal the end-user's private information. Furthermore, CASO can provide a cost-aware trade-off so that the end-user can achieve the desired security levels by selecting different outsourcing strategies with different computational and communication overhead. In the following analysis, the computational problems are divided into two categories: linear systems and non-linear systems due to their different mathematical properties. This design is extended to non-linear problems, and the result verification scheme is introduced in subsequent sections.

In this section, the cost-aware secure outsourcing scheme for general computational problems is presented. In the region of linear computation, a system of linear equations may be deployed as a case study to show the principles of the design. Then it is shown that the proposed CASO can be well extended to linear programming.

Regarding the outsourcing scheme, in the problem transformation phase, the end-user first generates a one-time secret key S={K, r}, where $K \in \mathbb{R}^{n \times n}$ is a non-singular matrix and $r \in \mathbb{R}^n$. Then x=Ky+r is a one-to-one mapping from x to y.

Suppose the computational problem is a system of linear equations Ax=b, where x, $b \in \mathbb{R}^n$ and A is an n×n nonsingular matrix. The function ProbTran {S, F (x)}→{G(y)} takes the secret key S={K, r} and the linear system as input and generates the output as AKy=b−Ar. Denote A'=AK and b'=b−Ar and the system is transformed to G(y): A'y=b' which can be outsourced to the cloud.

In the phase of cloud computation, the cloud solves G(y) utilizing the typical methods and returns the solution $y^*$ to the end-user. Then in the result recovery phase, the end-user recovers the solution to the original system of linear equations as $x^*=Ky^*+r$. The result verification will be discussed in subsequent sections.

Regarding the design analysis, from the above outsourcing scheme, it can be seen that the computational overhead for the end-user incurs both in the problem transformation and the result recovery phase. To be more specific, in the problem transformation phase, the end-user needs to calculate AK and Ar. To recover the original solution $x^*$ from the received solution $y^*$, the end-user has to calculate $Ky^*$. Among those operations, the matrix multiplication AK is the most computationally expensive one. Thus, the following discussion includes an analysis of the number of multiplications M required to compute AK. In the following analysis, $A=\{a_{ij}|i,j=1, 2, \ldots, n\}$ and $K=\{k_{ij}|i,j=1, 2, \ldots, n\}$ is denoted.

To multiply two arbitrary n×n matrices, the typical complexity is $O(n^3)$, which is generally believed to be too high and unacceptable for mobile client computation. However, in the disclosed design, it is possible to control the complexity by selecting matrix K properly so that the computational complexity can be effectively reduced without compromising security. Since matrix multiplication is the most expensive part of the end-user's processing, the goal is to ensure that the complexity of multiplying K with an arbitrary matrix A is bounded by $O(n^2)$, which is within the end-user's computational constraints. The following sections provide four schemes with different types of nonsingular secret key K based on the above described complexity constraints.

1) K is a Diagonal Matrix (Scheme-1): A diagonal matrix K has the format $K=\{k_{ij}|k_{ij}=0 \text{ if } i \neq j \text{ and } k_{ij} \neq 0 \text{ otherwise}\}$. Since K must be non-singular, all the entries in the diagonal have to be non-zero numbers. When K is a diagonal matrix, $M=n^2$.

2) K is a Permutation Matrix (Scheme-2): A permutation matrix K has exactly one non-zero entry in each row and each column in the matrix. When K is a permutation matrix, $M=n^2$.

3) K is a Band Matrix (Scheme-3): Suppose the band matrix K has an upper half-bandwidth p and a lower half-bandwidth q such that $k_{ij}=0$ for i>j+p and j>i+q. The total bandwidth of K is denoted by W=p+q+1. When K is a band matrix, for simplicity, it is assumed that K has an equal upper and lower half-bandwidth $p=q=\omega$, then $W=2\omega+1$, and the number of multiplications M can be calculated as $M=(2\omega+1)n^2-(\omega^2+\omega)n$.

4) K is a sparse matrix (Scheme-4): Suppose K is a sparse matrix. The density d is defined as the ratio of non-zero elements in the matrix. It is assumed that the number of non-zero elements in each row and each column of K is up-bounded by a constant $\theta$. When K is a sparse matrix, it is usually stored in a special manner such as Dictionary of Keys (DOK) in computation. Thus, the complexity of matrix multiplication can be approximately measured by the number of non-zero elements, which is $dn^3$ in this discussion. Since it has been assumed that $d \leq (\theta/n)$, the number of multiplication becomes $M=\theta n^2$.

In summary, through the above analysis, it is demonstrated that for the four proposed schemes, the complexity of multiplying K with an arbitrary matrix A is $O(n^2)$. Since matrix multiplication is the most expensive part of the end-user's processing, it can be derived that the overall computational complexity for the end-user is $O(n^2)$, which is within the end-user's computational constraints.

For the four types of matrices, a sparse matrix is the most general case. When the non-zero elements are centralized around the diagonal, then the sparse matrix K becomes a band matrix. When $\theta=W$, the complexity of scheme-3 and scheme-4 is in the same level. The only difference is that the non-zero elements are randomly distributed in sparse matrix. This difference may provide different security protection for side information which we will explain in detail later. Further, when $\theta=1$, then K becomes a permutation matrix as in scheme-2. Similarly when $W=1$, then the band matrix K becomes a diagonal matrix. Generally speaking, from scheme-1 to scheme-4, the computational complexity increases. In the following sections, the security of CASO will be analyzed.

In this section, the security of the proposed CASO will be analyzed, focusing on the security of the coefficient matrix A of the original function $F(x)$, the variable x in the function $F(x)$ and the form of the function $F(x)$.

The following theorem (Theorem 6) applies to the disclosed invention. For the four schemes in CASO, it is computationally infeasible for the cloud to recover the original coefficient matrix A of problem $F(x)$ and the output $x^*$ for the system of linear equations.

Proof:

For a system of linear equations $Ax=b$, the original problem is represented by the matrix A and the vector b. The output is $x^*$, which is the solution of the system. Under the affine mapping, the system of equations is transformed to $A'y=b'$, where $A'=AK$ and $b'=b-Ar$. Therefore, both A and b are concealed by the secret key $S=\{K, r\}$. Since both K and r are only used once and kept secret at the local side, the equations can be concealed form the cloud. Additionally, since the original solution is recovered by $x^*=Ky^*+r$, without knowing K and r, the cloud cannot recover $x^*$. In this way, the output of the system is concealed. Thus, all the four schemes are secure in outsourcing the system of linear equations.

The following theorem (Theorem 7) applies to the disclosed invention. Under the proposed CASO scheme, it is computationally infeasible for the cloud to recover the zeros, poles and optimums.

Proof Under the affine mapping $x=Ky+r$, the values of x is being mapped to $y=K^{-1}(x-r)$. Since both r and K are secret and randomly selected, it is computationally infeasible to recover x from y. As a result, given y, the zeros, poles and optimums are concealed. The protection depends on the selection of K and r.

While the coefficient matrix A cannot be recovered, the four schemes do provide different levels of security protection for side information. For scheme-1, the zeros of the coefficient matrix A' of the outsourced problem are also the zeros of the original problem. The order of the entries in each column of A' is the same as that of A. For scheme-2, while the number of zeros for A' and A are the same in each column, the distribution of the zeros and the order of the entries in each column are different. For scheme-3 and scheme-4, both the number of zeros and the distribution of entries in each column of A' and A are different. Therefore, the end user should select the scheme based on whether the possible side information that may be leaked from scheme-1 and scheme-2 is sensitive.

The following theorem (Theorem 8) applies to the disclosed invention. Suppose $\psi$ is a rational mapping, meaning that $\psi$ can be represented as a quotient of two polynomial functions, $G=F \cdot \psi$, then we have the following results: 1) If F is a rational function, then G is rational. 2) If F is an irrational function, then G is irrational.

Proof: Since $\psi$ is a rational mapping, we assume $\psi(x)=(P(x))/(Q(x))$, where $P(x)$ and $Q(x)$ are polynomials. When F is a rational function, suppose $$F(x) = \frac{a_0 + a_1 x + \ldots + a_n x^n}{b_0 + b_1 x + \ldots + b_m x^m}.$$

Then $$(F \circ \psi)(x) = \frac{a_0 + a_1 \frac{P(x)}{Q(x)} + \ldots + a_n \frac{P^n(x)}{Q^n(x)}}{b_0 + b_1 \frac{P(x)}{Q(x)} + \ldots + b_m \frac{P^m(x)}{Q^m(x)}}.$$

Without loss of generality, we assume that $m>n$. Then we have $$(F \circ \psi)(x) = \frac{a_0 Q^m(x) + a_1 P(x) Q^{m-1}(x) + \ldots + a_n P^n(x) Q^{m-n}(x)}{b_0 Q^m(x) + b_1 P(x) Q^{m-1}(x) + \ldots + b_m P^m(x)},$$

where $F \cdot \psi$ is the quotient of two polynomials. Thus, the composition $G=F \cdot \psi$ is a rational function.

When F is irrational, the composition $G=F \cdot \psi$ cannot be rational. Otherwise, there exists an inverse rational function $\psi^{-1}$ such that $F=G \cdot \psi^{-1}=F \cdot \psi \cdot \psi^{-1}$ becomes rational. Hence, $G=F \cdot \psi$ is irrational when F is irrational.

Since the proposed affine mapping is rational, the following corollary (Corollary 9) applies to the disclosed invention. Under an affine mapping $\psi$, the rationality of the function G is the same as the original function F.

Theorem 8 and Corollary 9 state that the rationality of the function F cannot be changed through composition with a rational mapping or an affine mapping $\psi$. That is, if the function F is rational, after the composition $G=F \cdot \psi$, the transformed function G is still rational. If F is irrational, G is still irrational. As a result, the side information that is related to the specific form of the function F (e.g., $\sin(\cdot)$ or $\log(\cdot)$) may not be fully concealed by an affine mapping or even a rational mapping.

Now, the side information that can be revealed by the coefficient matrix A of the four schemes will be analyzed. Under an affine mapping, the coefficient matrix A is transformed to AK. For scheme-1, the secret key K is a diagonal matrix denoted by $K_1 = \{k_{ij}|k_{ij}=0 \text{ if } i \neq j \text{ and } k_{ij} \neq 0 \text{ otherwise}\}$. The entry $a'_{ij}$ in A' can be calculated as $a'_{ij}=k_{ii}a_{ij}$. By investigating A', it can be seen that each column in A' is related in a simple way to that in A such that the $i^{th}$ column in A' is the multiplication of the $i^{th}$ column in A with $k_{ii}$. In this way, only based on A', the cloud can easily know the ratio between any two entries within the same column in A.

For K to be a permutation matrix in scheme-2, the difference is that A' in scheme-2 can be regarded as the result of permuting the columns of A' obtained from scheme-1. Thus, although the cloud can get a knowledge of the ratio between two entries in the same column of A, it is not sure which particular column those two entries belong to. Therefore, scheme-2 is more secure than scheme-1 in terms of concealing the side information of the outsourced problem.

In scheme-3, for K to be a band matrix with upper half-bandwidth and lower half-bandwidth both equal to $\omega$, it can be calculated that $$a'_{ij} = \sum_{r=j-\omega}^{j+\omega} a_{ir}k_{rj}.$$

Since each entry in A' is a linear combination of $\alpha_3$ entries in A and $\beta_3$ entries in K, the ratio information of entries in A is concealed. However, the disadvantage is that the cloud can still learn how a particular entry in A' is composed. For example, suppose $\omega=1$, the cloud can know for sure that $a'_{ij}=a_{i(j-1)}k_{(j-1)j}+a_{ij}k_{jj}+a_{i(j+1)}k_{(j+1)j}$. At last, for K to be a sparse matrix with scheme-4, it is assumed that there are exactly $\theta$ non-zero entries in each row and column of K. Similar to scheme-3, the ratio information of entries in A can be concealed. Moreover, since the non-zero entries are randomly positioned in the sparse matrix K, the cloud is unable to know how each entry in A' is composed.

From the above analysis, it can be seen that the coefficient matrix A is protected through the linear combination of the entries in A and K. To be specific, in scheme-1 the effect is the scaling of the columns of A. In scheme-2, the effect is scaling and permutation. In scheme-3 and scheme-4, the entries in A and K are related in a more complex way. The computational complexity and security of CASO is summarized in Table I.

TABLE I

COMPLEXITY AND SECURITY OF EACH SCHEME

| Scheme | Complexity |
| --- | --- |
| Diagonal matrix | $n^2$ |
| Permutation matrix | $n^2$ |
| Band matrix with bandwidth $W = (2\omega + 1)$ | $Wn^2$ |
| Sparse matrix with density $d = \theta/n$ | $\theta n^2$ |

Regarding the trade-off between complexity and security, from the above complexity and security analysis, it can be seen that there is a trade-off between the computational complexity and security. As the simple scheme, scheme-1 is able to protect the original coefficient matrix while exposing the ratio between any two entries in the same column. In comparison, scheme-2 is slightly more expensive (e.g. the positions of the non-zero entries have to be stored), but it is this cost for non-zero entries' random positions that makes it effective to conceal the ratio information. The complexity of scheme-3 and scheme-4 is linearly dependent on W and $\theta$, respectively. They are more costly than scheme-1 and scheme-2. However, the transformed matrix A' can conceal A and K in a more complex way since it can conceal the structure of the coefficient matrix. In summary, from scheme-1 to scheme-4, the security levels that they can provide increase at a cost of computational power.

In the context of cloud computing, the end-users vary from mobile devices to powerful work-stations thus having different computational constraints as well as different security demands. Thus, CASO provides end-users with the flexibility to choose the outsourcing schemes that are most suitable for them. These four schemes give cost-aware outsourcing for end-users to address the various security demands and computational constraints.

In this section, regarding application to linear programming, it will be demonstrated that the design and analysis for system of linear equations can be well applied to many computational problems, such as linear programming. A linear programming problem is considered denoted by $$F(x) := \begin{cases} \text{minimize} & c^T x \\ \text{subject to} & Ax = b, \\ & Dx \geq 0 \end{cases}$$

where b, $c \in \mathbb{R}^n$ $A \in \mathbb{R}^{m \times n}$ and $D \in \mathbb{R}^{s \times n}$ (m, s≤n)
Under the affine mapping x=Ky+r, the problem is transformed to $$G(y) := \begin{cases} \text{minimize} & c^T Ky + c^T r \\ \text{subject to} & AKy = b - Ar, \\ & DKy \geq -Dr \end{cases}$$

from which we can see that the original coefficient matrix can be concealed by the secret key K and r. The computational bottleneck lies in the multiplication of K with A and D. Thus, the same complexity and security analysis for systems of linear equations applies for linear programming. That is, the complexity of the previous four schemes is all bounded by $O(n^2)$. In terms of security, the four schemes are all secure in protecting the original coefficient matrix while providing different levels of protection of the side information. In the next section, the differences for non-linear computation by investigating system of non-linear equations and convex optimization problems will be explored. The design may be extended to non-linear problems and the result verification scheme is introduced in subsequent sections.

This section, regarding extension to non-linear systems, explores the different design issues between linear and non-linear computation. A system of non-linear equations is considered denoted by $F(x)=0$, where $F(x)=\{f_i(x)|f_i(x): \mathbb{R}^n \rightarrow \mathbb{R}, i=1, 2, \ldots, n\}$. Typically, it is hard to obtain a symbolic solution for the system. Thus, the normal method is to solve the system of equations numerically in an iterative way. The main idea is that given a solution $x_k$ in the $k^{th}$ iteration, we need to solve the linear system $\partial F(x)|_{x=x_k} (x_{k+1}-x_k) = -F(x)|_{x=x_k}$, where $\partial F(x)$ is the Jacob matrix of $F(x)$. Then we can obtain the solution $x_{k+1}$ in the $(k+1)^{th}$ iteration. The iteration will terminate when $\|F(x)\| < \varepsilon$, where $\varepsilon$ is the error tolerance and $x^*$ is the final solution. To minimize the communication overhead and the energy consumption of the end-users, the goal is to design an off-line scheme so that the end-users are not required to interact with the cloud except the problem outsourcing and result retrieving process. In this way, the end-users only need to focus on the high level view of the problem without knowing the details of problem solving process. The detailed design and analysis of the outsourcing scheme are presented as follows.

Compared with outsourcing of the system of linear equations, the main difference lies in the problem transformation phase. First, to start the iteration at the cloud side, an initial guess of the solution should also be outsourced. It is assumed that at the local side, the end-user generates an initial solution $x_0$. Then with the affine mapping, the outsourced initial solution becomes $y_0 = K^{-1}(x_0 - r)$. It should be noted that there is an inversion operation on K which will impose more constraints on our selection of K in terms of computational complexity. Second, after substituting x with y, the problem should be further transformed. A simple example is used to illustrate this point. Suppose we want to solve a system of non-linear equations $$F(x) := \begin{cases} \sin(3x_1) + 4x_2^2 + x_2 x_3 = 0 \\ 2x_1 + e^{3x_2} + 2x_3^3 = 0 \\ lg(5x_1) + \dfrac{1}{2x_2 + 1} + 3(x_3 + 1)^2 = 0 \end{cases}.$$

We take the affine mapping x=Ky+r, where r=0 and $$K = \begin{bmatrix} 3 & 0 & 0 \\ 0 & 2 & 0 \\ 0 & 0 & 4 \end{bmatrix}.$$

Then the system is transformed to $$G(y) := \begin{cases} \sin(9y_1) + 16y_2^2 + 8y_2 y_3 = 0 \\ 6y_1 + e^{6y_2} + 128y_3^3 = 0 \\ lg(15y_1) + \dfrac{1}{4y_2 + 1} + 48y_3 + 24y_3 = -3 \end{cases}.$$

To protect the cloud from revealing information from the transformed system, it is sufficient to mix the coefficient of each term in the equations with the key entry. To be specific, we assume that there are $\pi_i$ terms in equation $f_i(x)$ and each term is denoted by $f_i^j(tx)$, where t is the coefficient. Then each equation in the system can be written as $$f_i(x) = \sum_{j=1}^{\pi_i} f_i^j(tx).$$

Under the affine mapping x=Ky+r, $f_i^j(tx)$ is transformed to $$g_i(y) = f_i(Ky + r) = \sum_{j=1}^{\pi_i} f_i^j(t(Ky + r)).$$

Thus, the coefficient t is concealed by K and r, which is similar to the case of the system of linear equations. However, as illustrated in the example, the multiplication cannot be simply carried out when $f_i^j(\cdot)$ is a polynomial. Thus, a further transformation is needed to mix t with K and r for polynomials.

Without loss of generality, it is assumed that the polynomial is denoted by $t^i x_i^m$ and in the affine mapping, K is a band matrix with bandwidth W=3 and r=0. Thus, under the affine mapping, the polynomial is transformed to $t_i(k_{i-1} y_{i-1} + k_i y_i + k_{i+1} y_{i+1})^m$. To mix the coefficient t i with the secret keys, one straightforward way is to expand the polynomial and then multiple it with $t_i$. However, the complexity is unacceptable for high order polynomials. Instead, it is proposed that it is sufficient to split the secret keys as $k_s = pq_s$ where s=i-1, i, i+1 such that $t_i(k_{i-1} y_{i-1} + k_i y_i + k_{i+1} y_{i+1})^m = t_i(pq_{i-1} y_{i-1} + pq_i y_i + pq_{i+1} y_{i+1})^m = t_i p^m (q_{i-1} y_{i-1} + q_i y_i + q_{i+1} y_{i+1})^m$. In this way, the coefficient $t_i$ in the original function and the secret keys $k_i$ are concealed.

Regarding complexity analysis, from the analysis above, it can be seen that the complexity of the problem transformation mainly depends on two aspects. One is the specific form of the equations, that is the number of polynomials in the equations. The other one is how x and y are related, which is determined by the number of non-zero entries in K. For a given system of non-linear equations, suppose that there are N terms in total in the systems, among which L are polynomials with orders no greater than m. Assume that the number of non-zero entries in K is up-bounded by $\lambda$ (i.e. each x is substituted by at most $\lambda$ y's). Thus, for each non-polynomial term, the transformation takes $\lambda$ multiplications between the coefficient of the term and the key entries. And for a polynomial term $t_i x_i^m$, it is assumed that it is replaced by $t_i(k_1 y_1 + \ldots + k_\lambda y_\lambda)^m = t_i(pq_1 y_1 + + pq_\lambda y_\lambda)^m = t_i p^m (q_1 y_1 + \ldots + q_\lambda y_\lambda)^m$. Then the operations involved in the transformation include one multiplication, $\lambda$ division and raising p to the power of m. As stated previously, we utilize the number of multiplication as a measurement for complexity. It can be assumed that in terms of computational complexity, one division is equal to one multiplication and with the method of exponentiation by squaring, the computation for $m^{th}$ power takes $\log^2 m$ multiplications. Thus, for a system of non-liner equations with N terms among which L are polynomials, the complexity can be calculated as $\lambda N + (\log^2 m + 1)L$.

The complexity depends on $\lambda$ which is further determined by the selection of K. The complexity of the four different types of matrices is summarized in Table II. It can be seen from the table that the complexities of all schemes are constrained to O(N), where N is the number of terms in the system of non-linear equations. Notice that typically for a system of equations, the number of terms N is in the level of $n^2$ where n is the number of independent variables. Thus, the complexity is still bounded by $O(n^2)$, which fulfills the design goals.

TABLE II

COMPLEXITY FOR SYSTEM OF NON-LINEAR EQUATIONS

| Scheme | Complexity |
| --- | --- |
| Diagonal matrix | N + ($\log^2$ m + 1)L |
| Permutation matrix | N + ($\log^2$ m + 1)L |
| Band matrix with bandwidth W = (2 ω + 1) | W N + ($\log^2$ m + 1)L |
| Sparse matrix with density d = θ/n | θ N + ($\log^2$ m + 1)L |

Figure 5:
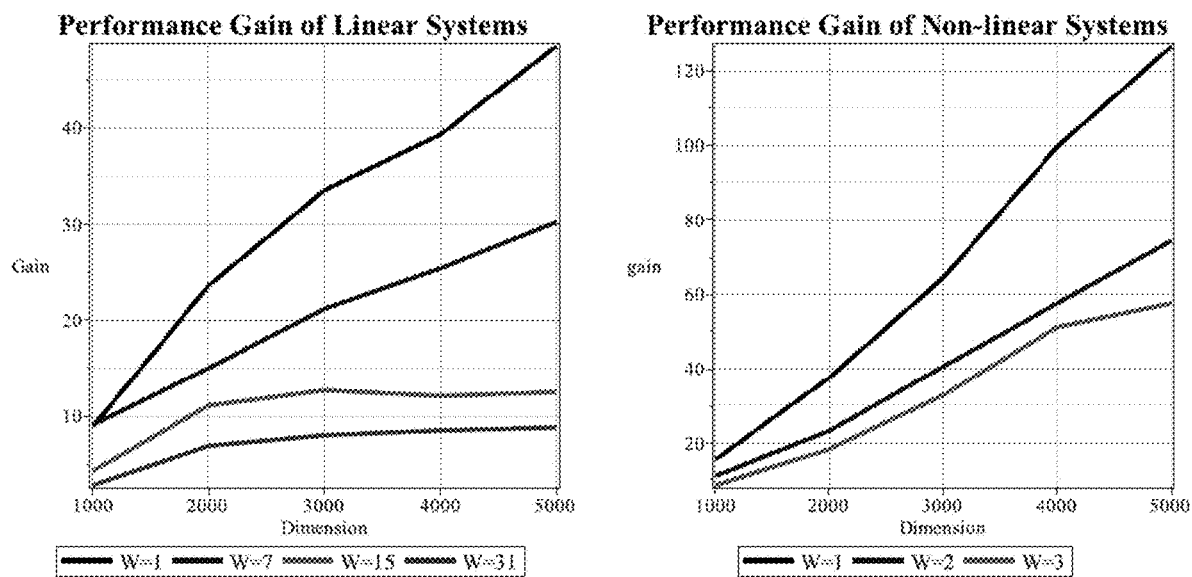
FIG. 5 is a comparison of performance gain in linear vs. non-linear systems

FIG. 5 demonstrates a comparison of a performance gain of linear systems vs. a performance gain of non-linear systems. This comparison demonstrates the tradeoff between the computational overhead required to apply security to the problem outsourced to the cloud, and the security provided for the problem. For purposes of this comparison, W is used to simulate computation overhead for the value of the bandwidth matrix. As demonstrated in this comparison, as W increases, the overall computational overhead will also increase. However, this increase in computational overhead provides value in the form of increased security, which, in turn, increases the additional privacy protection to the original problem and the final result.

The gain along the X axis represents an improvement to the throughput of outsourcing the problem as compared to the throughput of generating a result for the problem on the local client computer. As a non-limiting example, 10, in the graph labeled "Performance Gain of Linear Systems," represents an increase in throughput by a factor of 10, or 10 times better throughput, when the problem is outsourced vs. calculated locally.

Regarding security analysis, similar to the security analysis for linear systems, all of the proposed four schemes are secure in protecting the coefficient matrix, the zeros, poles and optimums of the outsourced problem. As stated in Corollary 9, CASO sometimes may not conceal the specific form of the functions. For instance, in the example given above, the original system of equations is transformed to G(y) such that the coefficients in each term of the function are changed. However, the specific forms of the function (e.g., sin(•), lg(•), etc.) remain unchanged.

For the four schemes, generally as the complexity increases, more side information can be concealed from the cloud. Different from the linear equations, a non-linear function $f_i(x)$ may contain some side information, such as maximum or minimum value which is important in some applications. For instance, the plot of the function or the extreme values may expose the distribution of the incidence of a disease among different age groups. For scheme-1 and scheme-2, the curve of the function is just a scaled version. Though scheme-2 provides better protection since it can conceal the independent variables. In scheme-3 and scheme-4, each independent variable in the original problem is substituted by several new variables. Thus, the side information, such as the curve and the extreme values can be perfectly concealed.

In this section, regarding application to convex optimization, it is shown that the above schemes and analysis can also be applied to convex optimization. Convex optimization is widely deployed in various practical problems. The following section considers a convex optimization problem denoted by $$F(x) := \begin{cases} \text{minimize} & f_0(x) \\ \text{subject to} & f_i(x) \leq 0, i = 1, \cdots, m \\ & h_j(x) = 0, j = 1, \cdots, t, \end{cases}$$

Referred to as equation (5) below, where $f_i: \mathbb{R}^n \to \mathbb{R}$, i=0, . . . , m and $h_j: \mathbb{R}^n \to \mathbb{R}$, i=1, . . . , t are all convex functions. Under the affine mapping x=Ky+r, the original problem F(x) is transformed to $$G(y) := \begin{cases} \text{minimize} & f_0(Ky + r) \\ \text{subject to} & f_i(Ky + r) \leq 0, i = 1, \cdots, m \\ & h_j(Ky + r) = 0, j = 1, \cdots, t \end{cases}$$

Since the key matrix K and r are randomly generated and kept secret at the local side, the coefficient matrix of the outsourced problem is perfectly protected. And because the functions $f_i(•)$ and $h_j(•)$ are all non-linear functions, the security and the complexity analysis of system of non-linear equations can be well applied in this case. Thus, it can be concluded that the outsourcing scheme is also applicable to convex optimization problems.

In this section, a result verification scheme is proposed under which the end-users are guaranteed to receive the valid results from the cloud. As stated previously, the cloud is not only curious about the end-users' private information, it may also behave "lazily" to increase its own benefits. That is, to reduce the computational cost, the cloud has the motivation to deploy less computational resources and simply returns some trivial results. As a consequence, the end-users are not able to recover the valid results from those returned by the cloud.

The general idea of the proposed verification scheme is to outsource the problem twice under two different affine mappings and to verify whether the two results returned by the cloud match with each other. To be specific, under the affine mappings $x=K_1y^*+r_1$ and $x=K_2z^*+r_2$, the original problem F(x) is transformed to G(y) and H(z) which are outsourced to the cloud. Then the cloud solves the two outsourced problems and returns the corresponding results y* and z*. Since the condition $K_1y^*+r_1=K_2z^*+r_2$ holds for these two results, the end-users can utilize it as a criterion to verify whether the returned results are valid.

The idea introduced above can be applied to a system of equations directly. When F(x) is a system of linear equations, it is sufficient to verify directly whether $\|Ax^*\| < \varepsilon$, where $\| \|$ denotes the Euclidean norm of a vector and c is a pre-defined error tolerance. The complexity of this verification process is $O(n^2)$.

When F(x) is a system of non-linear equations, since the end-user will have to evaluate the non-linear functions, the computational cost for direct verification generally exceeds $O(n^2)$. However, based on our idea of outsourcing twice, the end-user only needs to check the condition $K_1y^*+r_1=K_2z^*+r_2$. Since the verification process involves only linear operations, the computational complexity is bounded by $O(n^2)$. As a system of equations is typically solved by iterative method, the solution is not accurate. Thus, the equality condition may need to be changed to $\|(K_1y^*+r_1)-(K_2z^*+r_2)\| < \varepsilon$. In the following analysis, the equality condition $K_1y^*+r_1=K_2z^*+r_2$ is uniformly utilized as the verification criteria. When the computational problems are solved inaccurately, the equality condition should be changed to its inequality variation.

Regarding optimization problems, when F(x) is an optimization problem, convex optimization is utilized as an example to illustrate the verification process. And it can be easily applied to other optimization problems, such as linear programming. The output of a convex optimization problem can be divided into three cases: normal, infeasible and unbounded. For the convex optimization problem defined in equation (5), the domain D is the set for which the objective function and the constraint functions are defined. That is $$\mathcal{D} = \bigcap_{i=1}^{m} \text{dom } f_i \cap \bigcap_{i=i}^{t} \text{dom } h_i.$$

The feasible set is $\varepsilon = \{x \in D | f_i(x) \le 0, i=1, \ldots, m, h_i(x)=0, i=1, \ldots, t\}$. In the normal case, there exists an optimal point $x^* \in E$ such that $f_0(x^*) \le f_0(x)$, $\forall x \in \varepsilon$. In the infeasible case, $\varepsilon = \emptyset$. In the unbounded case, there exists points $x_k \in \varepsilon$ such that $f_0(x_k) \to -\infty$ as $k \to \infty$.

For the cloud to cheat, it must return results in the same case for the two outsourced problems G(y) and H(z) as mentioned above. Suppose that y* and z* are the two returned results and they belong to the same case. In the following, the verification scheme for the three different cases will be presented separately.

1) Normal Case:

The above proposed verification scheme works well for the normal case. That is if the equality $K_1 y^* + r_1 = K_2 z^* + r_2$ holds, the end-user can make sure that a valid result can be recovered. This is because whatever the correct result is (normal, infeasible or unbounded), the cloud is not able to come up with two results that satisfy the equality without actually conducting the computation process. And this verification process for a normal case forms the basis for the verification for other cases.

2) Infeasible Case:

The above verification scheme would fail if the cloud simply returns an infeasible result for any outsourced convex optimization problem. To deal with this issue, phase I methods are utilized to check the feasibility of the problem. For a convex optimization problem F(x), a corresponding phase I optimization problem can be constructed as:

$$F_I(x) := \begin{cases} \text{minimize} & \rho \\ \text{subject to} & f_i(x) \le p, i=1, \cdots, m, \\ & h_j(x) = 0, j=1, \cdots, t \end{cases}$$

where $\rho$ is a single variable. When $\rho$ is large enough, $F_I(x)$ is always feasible.

Suppose x* minimizes the objective function and $\rho^*$ is the corresponding minimum value. The phase I problem is designed in such a way that when $\rho^* \le 0$, the original problem F(x) is feasible and F(x) is infeasible otherwise. Thus, the verification scheme for infeasible case can be designed as follows. When the cloud indicates that the solutions to the two outsourced problem G(y) and H(z) are infeasible, it then generates the corresponding two phase I problems $G_I(y)$ and $H_I(z)$ and computes the optimal points y* and z* and the minimum values $\rho^*_G$ and $\rho^*_H$, respectively. Then at the local side, the verification is the same as that in the normal case. That is only when $\rho^*_G > 0$ and $\rho^*_H > 0$ and the equality $K_1 y^* + r_1 = K_2 z^* + r2$ holds can the end-user be guaranteed to receive valid solutions.

3) Unbounded Case:

In the unbounded case, the cloud indicates that the objective function $f_0(x) \to -\infty$ in its domain. Duality is utilized to verify the soundness of the returned result. For a convex optimization problem, the corresponding Lagrangian L can be constructed as $$L(x, u, v) = f_0(x) + \sum_{i=1}^{m} u_i f_i(x) + \sum_{j=1}^{t} v_j h_j(x),$$

where $u \in \mathbb{R}$ and $v \in \mathbb{R}^t$ are the associated Lagrange multiplier vectors. Then based on this Lagrangian L(x, u, v), a Lagrange dual function can be constructed as $$\Phi(u, v) = \inf_{x \in \mathcal{D}} L(x, u, v)$$
$$= \inf_{x \in \mathcal{D}} \left( f_0(x) + \sum_{i=1}^{m} u_i f_i(x) + \sum_{j=1}^{t} v_j h_j(x) \right),$$

where D is the domain of the optimization problem. From this definition, it is easy to prove that $\forall u \ge 0$, we have the following inequality:

$$\Phi(u,v) \le L(x^*, u, v) \le f_0(x^*)$$

where $f_0(x^*)$ denotes the optimal value of the objective function. The above inequality gives a lower bounded of the objective function that depends on the selection of u and v. Thus, among all the selections of u and v, find the optimal lower bound is equivalent to solving the following optimization problem:

$$\begin{cases} \text{maximize} & \Phi(u, v) \\ \text{subject to} & u \ge 0 \end{cases}.$$

The objective function $\Phi(u, v)$ is concave since it is the point-wise infimum of a series of affine function of (u, v). Thus, the above optimization problem is also a convex optimization problem. If the original problem is unbounded below, the convex optimization problem described above should be infeasible since it gives a lower bound of the optimal value in the original problem. Thus, the remaining task is to verify the feasibility of the above convex optimization problem, which has been illustrated in the infeasible case. Let the cloud solve the phase I problems of the two Lagrange dual problems and return the optimal solutions denoted by $(\rho^*_G, y^*_G, u^*_G, v^*_G)$ and $(\rho^*_H, y_H, u^*_H, v^*_H)$. At the local side, the end-user then checks whether $\rho^*_G > 0$ and $\rho^*_H > 0$ and whether the equality $K_1 y^* + r_1 = K_2 z^* + r_2$ holds.

The steps included in the embodiments illustrated and described in relation to FIGS. 1-9 are not limited to the embodiment shown and may be combined in several different orders and modified within multiple other embodiments. Although disclosed in specific combinations within these figures, the steps disclosed may be independent, arranged and combined in any order and/or dependent on any other steps or combinations of steps.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:
1. A system, comprising:
at least one processor of a network of server computers;
at least one memory of the network of server computers, coupled to the at least one processor, and having stored thereon a set of instructions which, when executed, cause the network of server computers to:
generate, using at least one graphical user interface (GUI) generation software module running on at least one server in the network of server computers, a GUI comprising:
a computational task submission GUI control configured to receive, from a user via the GUI displayed on a client computer coupled to the network a request to execute a computational task;
a computational task and independent variable transformation GUI control configured to receive, from the user via the GUI, a computational task data and at least one independent variable data for the computational task; and
an outsourced strategy selection GUI control configured to receive, from the user via the GUI, a selection of an outsourcing strategy defining a computational complexity reduction that does not compromise a security of the computational task, the outsourcing strategy selected from the group consisting of a diagonal matrix, a permutation matrix, a band matrix, or a sparse matrix; and
receive, from the GUI displayed on the client computer, at least one transformed input, transformed by the client computer from the computational task data input by a user, to be utilized by the network to execute the computational task, the client computer having transformed at least one original input into the at least one transformed input:
using an affine mapping based scheme according to a coefficient matrix in which the at least one transformed input is a one-to-one equivalent to the at least one original input, but cannot be inferred by a computational resource from the transformed input alone; and
according to a selection from the outsourced strategy selection GUI control, limiting the computational complexity of the affine mapping scheme according to at least one resource constraint of the client computer;
execute the computational task;
transmit, to the client computer a result of the computational task; and
receive, from a result verification GUI control on the GUI, responsive to the client computer applying an inverse affine mapping scheme to the result, a verification that the result of the computational task comprises a complete and valid result, wherein the verification comprises:
the server computer generating a first result using a first affine mapping;
the server computer generating a second result using a second affine mapping; and
identifying a match between the first result and the second result.
2. The system of claim 1, wherein:
the computational task comprises a software calculation function receiving, as the at least one transformed input, at least one transformed independent variable as a function parameter; and
the result of the computational task comprises:
a solution to the software calculation function utilizing the at least one independent transformed variable; and
a proof of the solution, wherein the verification includes a decision, based on the proof, validating the solution.
3. The system of claim 1, wherein the at least one resource constraint on the client computer comprises a limit of:
$\theta(n^2)$ for a resource overhead caused by:
a first transformation of the transformed input;
a second transformation of the result; and
the verification; and
a request overhead being no greater for the at least one transformed input as would be required for the at least one original input.
4. A method for computing complex computational tasks by securely engaging remote resources comprising:
generating, using at least one graphical user interface (GUI) generation software module running on a server computer in the network of server computers, a GUI comprising:
a computational task submission GUI control configured to receive, from a user via the GUI displayed on a user's client computer coupled to the network, a request to execute a computational task;
a computational task and independent variable transformation GUI control configured to receive, from the user via the GUI, a computational task data and at least one independent variable data for the computational task; and
an outsourced strategy selection GUI control configured to receive, from the user via the GUI, a selection of an outsourcing strategy defining a computational complexity reduction that does not compromise a security of the computational task, the outsourcing strategy selected from the group consisting of a diagonal matrix, a permutation matrix, a band matrix, or a sparse matrix;
transforming via at least one processor of the user's client computer at least one original input into at least one transformed input using an affine mapping based scheme according to a coefficient matrix in which the at least one transformed input is a one-to-one equivalent to the at least one original input, wherein the original input cannot be inferred by a computational resource from the transformed input alone; and
according to at least one user setting, limiting the computational complexity of the affine mapping scheme according to at least one resource constraint of the user's client computer;
transmitting to a remote computer network:
the at least one transformed input; and
a request to execute the computational task using the at least one transformed input;
receiving from the remote computer network, a result of the computational task; and
via a processor of the user's client computer, applying an inverse affine mapping scheme to the result, to determine whether the result of the computational task comprises a complete and valid result, further comprising the steps of:
the server computer generating a first result using a first affine mapping;
the server computer generating a second result using a second affine mapping; and
identifying a match between the first result and the second result.

5. A system, comprising:
at least one server processor of a network;
at least one memory of the network, coupled to the at least one processor, and having stored thereon a set of instructions which, when executed, cause the network to:
  generate, using at least one graphical user interface (GUI) generation software module running on at least one server in the network of server computers, a GUI comprising:
    a computational task submission GUI control configured to receive, from a user via the GUI displayed on a client computer coupled to the network a request to execute a computational task;
    a computational task and independent variable transformation GUI control configured to receive, from the user via the GUI, a computational task data and at least one independent variable data for the computational task; and
    an outsourced strategy selection GUI control configured to receive, from the user via the GUI, a selection of an outsourcing strategy defining a computational complexity reduction that does not compromise a security of the computational task, the outsourcing strategy selected from the group consisting of a diagonal matrix, a permutation matrix, a band matrix, or a sparse matrix; and
  receive, from the GUI displayed on the client computer, at least one input transformed by the client computer from the computational task data input by a user, at least one original input into the at least one transformed input:
    using an affine mapping based scheme according to a coefficient matrix in which the at least one transformed input is a one-to-one equivalent to the at least one original input, but cannot be inferred by the network; and
    according to a selection from outsourced strategy selection GUI control, limiting the computational complexity of the affine mapping scheme according to at least one resource constraint of the client computer;
  execute the computational task using the at least one transformed input;
  transmit, to the client computer a result of the computational task; and
  receive, responsive to the client computer applying an inverse affine mapping scheme to the result, a verification that the result of the computational task comprises a complete and valid result.

6. A method for computing computational tasks comprising:
  generating, using at least one graphical user interface (GUI) generation software module running on a server computer in the network of server computers, a GUI comprising:
    a computational task submission GUI control configured to receive, from a user via the GUI displayed on a user's client computer coupled to the network, a request to execute a computational task;
    a computational task and independent variable transformation GUI control configured to receive, from the user via the GUI, a computational task data and at least one independent variable data for the computational task; and
    an outsourced strategy selection GUI control configured to receive, from the user via the GUI, a selection of an outsourcing strategy defining a computational complexity reduction that does not compromise a security of the computational task, the outsourcing strategy selected from the group consisting of a diagonal matrix, a permutation matrix, a band matrix, or a sparse matrix;
  transforming via at least one processor of the user's client computer at least one original input into at least one transformed input using an affine mapping based scheme according to a coefficient matrix in which the at least one transformed input is a one-to-one equivalent to the at least one original input, wherein the original input cannot be inferred by a computational resource from the transformed input alone; and
  according to at least one user setting, limiting the computational complexity of the affine mapping scheme according to at least one resource constraint of the user's client computer;
  transmitting to a remote computer network:
    the at least one transformed input; and
    a request to execute the computational task using the at least one transformed input;
  receiving from the remote computer network, a result of the computational task; and
  via a processor of the client computer, applying an inverse affine mapping scheme to the result, to determine whether the result of the computational task comprises a complete and valid result.

7. A system for computing computational tasks comprising:
at least one processor of a network of server computers;
at least one memory of the network of server computers, coupled to the at least one processor, and having stored thereon a set of instructions which, when executed, cause the network of server computers to:
  receive, from a client device coupled to the network a request to execute a general computational problem, the request comprising:
    at least one transformed problem, the client device having transformed at least one original computational problem into the at least one transformed problem using an affine mapping based scheme;
  determine whether the general computational problem comprises a non-linear problem or convex optimization, and if so, receive a transformed initial solution from the client device;
  perform computation of the transformed problem;
  transmit, to the client device a result of the computation of the transformed problem.

8. A system for computing computational tasks comprising:
at least one processor of a client device;
at least one memory of the client device, coupled to the at least one processor, and having stored thereon a set of instructions which, when executed, cause the client device to:
  identify a computational problem for outsourcing;
  transform the computational problem into a transformed problem using an affine mapping based scheme;
  if the computational problem comprises a non-linear problem or convex optimization, determine an initial solution for the computational problem;
  transmit the transformed problem to a cloud network for computation;
  receive from the cloud network a result of computation of the transformed problem; and transform the received result into an original result and verify accuracy of the original result as a solution of the computational problem.

9. The system of claim 8, wherein the instructions further cause the device to transform the computational problem using a one-to-one mapping of variables based on a one-time secret key.

10. The system of claim 9 wherein the affine mapping based scheme utilizes a diagonal matrix for the one-to-one mapping of variables.

11. The system of claim 9 wherein the affine mapping based scheme utilizes a permutation matrix for the one-to-one mapping of variables.

12. The system of claim 9 wherein the affine mapping based scheme utilizes a band matrix for the one-to-one mapping of variables.

13. The system of claim 9 wherein the affine mapping based scheme utilizes a sparse matrix for the one-to-one mapping of variables.

14. The system of claim 9 wherein the instructions further cause the device to determine if the computational problem comprises a nonlinear equation that contains polynomials, and if so, split the secret key.

* * * * *